R. S. SILVIS AND T. EVERS.
AUTOMATIC FEED.
APPLICATION FILED APR. 2, 1920.

1,427,027.

Patented Aug. 22, 1922.
2 SHEETS—SHEET 1.

R. S. Silvis
T. Evers    INVENTORS

R. S. SILVIS AND T. EVERS.
AUTOMATIC FEED.
APPLICATION FILED APR. 2, 1920.

1,427,027.

Patented Aug. 22, 1922.
2 SHEETS—SHEET 2.

R. S. Silvis
T. Evers INVENTORS
BY Victor J. Evans
ATTORNEY

WITNESS:

UNITED STATES PATENT OFFICE.

RICHARD S. SILVIS AND THEODORE EVERS, OF ROCK ISLAND, ILLINOIS.

AUTOMATIC FEED.

1,427,027.

Specification of Letters Patent. Patented Aug. 22, 1922.

Application filed April 2, 1920. Serial No. 370,874.

*To all whom it may concern:*

Be it known that we, RICHARD S. SILVIS and THEODORE EVERS, citizens of the United States of America, residing at Rock Island, in the county of Rock Island and State of Illinois, have invented new and useful Improvements in Automatic Feeds, of which the following is a specification.

This invention relates to improvements in automatic fluid feeding devices and has for an object the provision of means for maintaining predetermined quantity of oil, or other liquid in a vessel or receptacle.

Another object is the provision of a liquid supply tank or container, which is provided with a novel arrangement of air controlled discharge means, for discharging its contents into a vessel or receptacle, the amount of liquid within the latter governing the admission of air into the container, so as to automatically regulate the flow.

Another object is the provision of a novel arrangement inlet discharge valve for the tank or container, so that when the inlet valve is opened to fill said tank, the outlet valve will automatically close, so that the admission of air during the filling operation will not cause the discharge of any of the contents of the tank.

With the above and other objects in view, the invention also includes the following novel features and details of construction, to be hereinafter more fully described, illustrated in the accompanying drawings and pointed out in the claim hereto appended.

In the drawings:—

Figure 1:
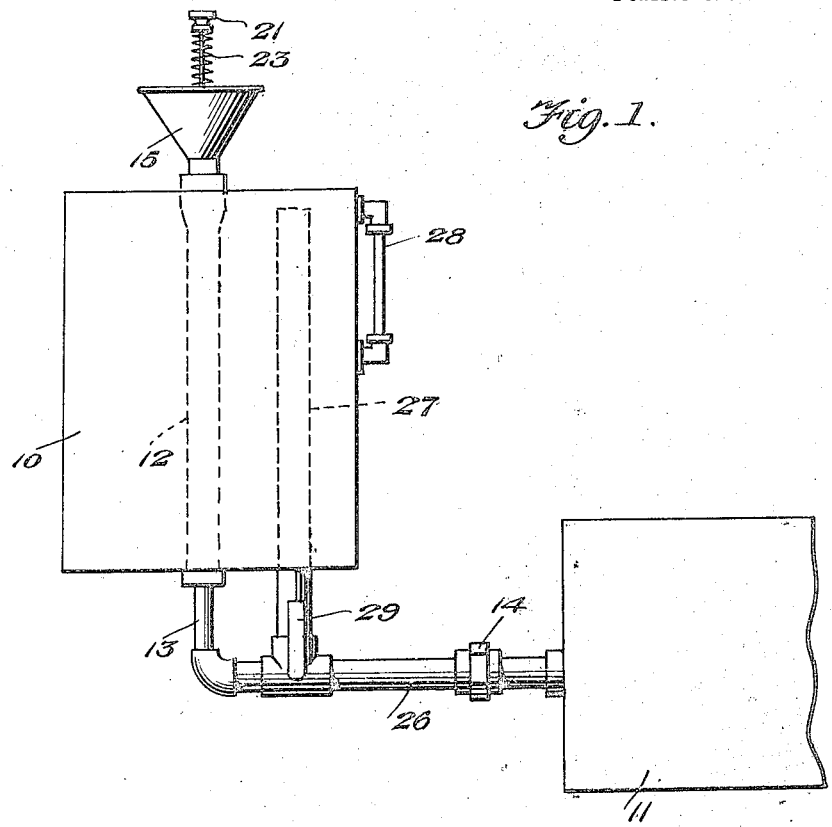
Figure 1 is a side elevation of the invention.
Figure 2:
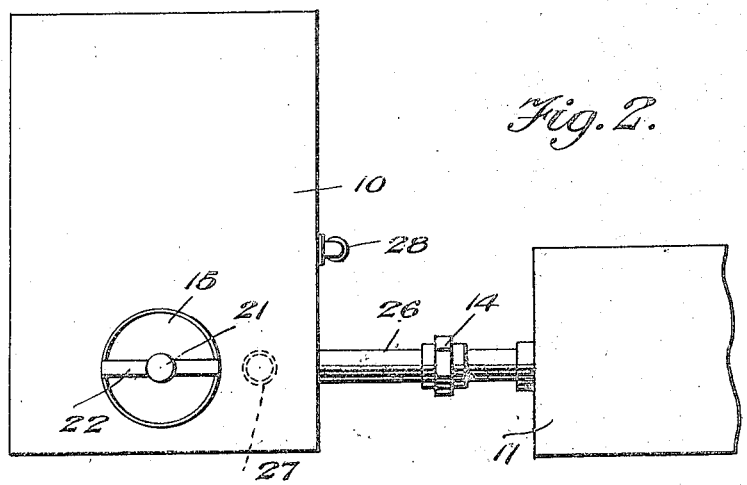
Figure 2 is a plan view of the same.
Figure 4:
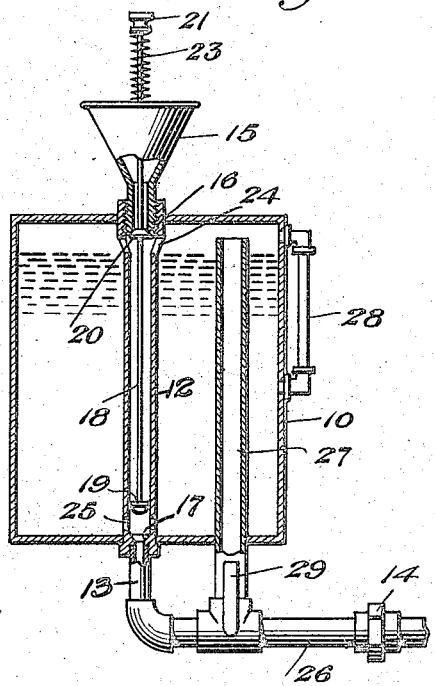
Figure 4 is a similar view with the valve in position for discharging.
Figure 3:
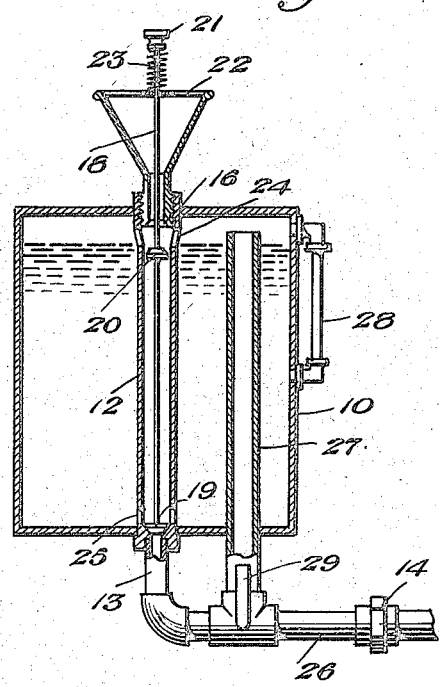
Figure 3 is a central vertical sectional view showing the valve in position for filling the tank.
Figure 5:
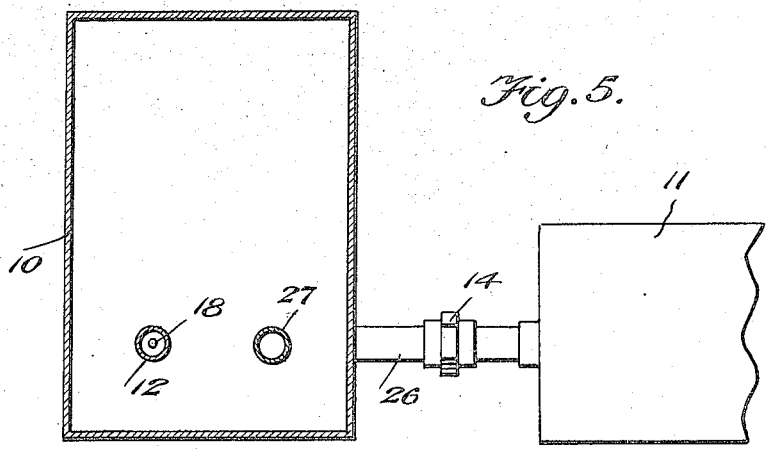
Figure 5 is a horizontal sectional view through the tank or container.

Referring specifically to the drawings, wherein like characters of reference denote corresponding parts throughout the several views, the reference character 10 indicates a supply tank or container, in which is contained the liquid to be supplied to a vessel or receptacle 11.

The invention contemplates means for maintaining predetermined quantity of liquid, such as oil, water or the like, within the vessel or receptacle 11, and for this purpose the tank or container 10 has extending vertically therethrough a pipe 12, the said pipe being preferably reduced as shown at 13 and connected to a vessel or receptacle 11 by means of a coupling member 14. The pipe 12 extends upward to the top of the receptacle and has connected thereto and communicating therewith, the small flared end of a funnel-like member 15 to provide a valve seat 16, while a similar seat 17 is provided by the restrictive portion at the lower end of the pipe.

Extending longitudinally through the pipe 12 is a valve stem 18, secured to the lower end of which is a valve 19 which is adapted for engagement with the seat 17. A space from the upper end of the rod 18, which extends upward through the funnel shaped member 15, is a valve 20, which is adapted to engage the seat 16, the valve being so spaced upon the rod 18 that when the upper valve is seated, the lower valve will be unseated and vice versa. Secured to the upper extremity of the stem 18 is a handle 21 and surrounding this stem between the handle and a cross member 22 carried by the funnel shaped member is a coil spring 23, whose office is to seat the valve 20 and unseat the valve 19.

Located within the pipe 12 adjacent the top of the tank 10 is a series of openings 24, the purpose of which is to permit of the passage of liquid from the funnel shaped member 15 through the pipe into the tank 10, the handle 21 being depressed so as to unseat the valve 20, which is then disposed below the opening 24 to permit of this operation. Also formed in the pipe 12 adjacent the bottom of the tank, is a plurality of openings 25, which, when the valve 19 is unseated will permit of the passage of liquid from the tank 10 through the receptive portion adjacent to the pipe, to the vessel or receptacle 11.

Extending from the horizontal portion 26 of the pipe connection between the tank or container 10 and the vessel or receptacle 11, is a pipe 27, the latter extending upward through the bottom of the receptacle into juxta-position with the pipe 12, the top of said pipe 27 being open and disposed above the point to which the tank is filled, this point being determined through the use of a gauge 28.

Extending from the point of connection of the pipes 26 and 27, is a short relatively small pipe 29, establishing communication with the atmosphere from the interior of the pipe, for the purpose of supplying air thereto.

In the operation of the invention, the tank or container 10 is filled to the proper point by depressing the handle 21 and unseating the valve 20 and seating the valve 19, wherefrom liquid poured into the funnel like member 15 will pass through the opening 24 into the tank, the filling operation continuing until the vessel or receptacle 11 has also been filled. When the supply of liquid in the vessel or receptacle becomes low, fluid will flow from the supply tank or container 10 and when the level of the fluid reaches a point below the point of communication or the pipe 29, the air passing upward through the pipe 27 will permit the fluid to flow from the tank until this level of the fluid reaches above the pipe 29, closing out the air and automatically cutting off the flow of fluid.

The invention is susceptible of various changes in its form, proportions and minor details of construction and the right is here reserved to make such changes as properly fall within the scope of the appended claim.

Having described the invention what is claimed is:—

The combination with a liquid receptacle, of a supply tank, a pipe extending vertically therethrough provided with a plurality of openings adjacent the top and bottom of said tank and having a reduced lower end providing a valve seat, a funnel shaped member secured to the upper end of said pipe and providing a valve seat, a valve stem extending longitudinally through said pipe and extending above said funnel shaped member, spaced valves carried by said stem adapted to alternately engage said valve seats, a cross member carried by said funnel shaped member, a handle secured to the upper end of said stem, a coil spring surrounding said stem and exerting a pressure between said handle and said cross member, a pipe connected to said receptacle and connected to the reduced end of the pipe extending through said tank, a pipe connected to the last mentioned pipe, extending through said tank adjacent to the first mentioned pipe and terminating short of the top of said tank, a relatively short pipe extending from the point of connection of the pipes aforesaid and communicating with the atmosphere, and a gauge connected to one side of said tank.

In testimony whereof we affix our signatures.

RICHARD S. SILVIS.
THEODORE EVERS.